United States Patent
Do

(10) Patent No.: US 11,659,293 B2
(45) Date of Patent: May 23, 2023

(54) IMAGE SENSING DEVICE FOR SENSING HIGH DYNAMIC RANGE IMAGES INCLUDING AIR LAYER

(71) Applicant: SK hynix Inc., Icheon-si (KR)

(72) Inventor: Young Woong Do, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/523,735

(22) Filed: Nov. 10, 2021

(65) Prior Publication Data

US 2022/0311959 A1 Sep. 29, 2022

(30) Foreign Application Priority Data

Mar. 23, 2021 (KR) .................. 10-2021-0037014

(51) Int. Cl.
*H04N 25/13* (2023.01)
*H04N 25/57* (2023.01)
*H04N 23/84* (2023.01)
*H04N 25/702* (2023.01)

(52) U.S. Cl.
CPC ............. *H04N 25/57* (2023.01); *H04N 23/84* (2023.01); *H04N 25/134* (2023.01); *H04N 25/702* (2023.01)

(58) Field of Classification Search
CPC .... H04N 5/355; H04N 5/3696; H04N 9/0451; H04N 9/04557
See application file for complete search history.

(56) References Cited

U.S. PATENT DOCUMENTS

| | | |
|---|---|---|
| 9,704,901 B2 | 7/2017 | Lin et al. |
| 9,966,396 B2 | 5/2018 | Qian et al. |
| 2020/0310178 A1* | 10/2020 | Zhou ................. G02F 1/137 |
| 2021/0248758 A1* | 8/2021 | Li ..................... H04N 9/04515 |

* cited by examiner

*Primary Examiner* — Mekonnen D Dagnew
(74) *Attorney, Agent, or Firm* — Perkins Coie LLP

(57) ABSTRACT

An image sensing device including optical filters adjacent to each other is disclosed. The image sensing device includes a substrate including first and second photoelectric conversion elements configured to generate photocharges corresponding to an intensity of incident light corresponding to a first color; a first pixel including a first optical filter disposed over the first photoelectric conversion element to selectively transmit the light corresponding to the first color; a second pixel including a second optical filter disposed over the second photoelectric conversion element to selectively transmit the light corresponding to the first color; and a first air layer disposed between the first optical filter and the first photoelectric conversion element to reflect light from the first optical filter.

20 Claims, 9 Drawing Sheets

IMAGE SENSING DEVICE FOR SENSING HIGH DYNAMIC RANGE IMAGES INCLUDING AIR LAYER

CROSS-REFERENCE TO RELATED APPLICATION

This patent document claims the priority and benefits of Korean patent application No. 10-2021-0037014, filed on Mar. 23, 2021, which is incorporated by reference in its entirety as part of the disclosure of this patent document.

TECHNICAL FIELD

The technology and implementations disclosed in this patent document generally relate to an image sensing device that includes optical filters adjacent to each other.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various devices such as smart phones, digital cameras, game machines, IOT (Internet of Things), robots, security cameras and medical micro cameras.

The image sensing device may be roughly divided into CCD (Charge Coupled Device) image sensing devices and CMOS (Complementary Metal Oxide Semiconductor) image sensing devices. The CCD image sensing devices offer a better image quality, but they tend to consume more power and are larger as compared to the CMOS image sensing devices. The CMOS image sensing devices are smaller in size and consume less power than the CCD image sensing devices. Furthermore, a CMOS fabrication technology can be used to incorporate photosensitive elements and other signal processing circuitry into a single chip, enabling the production of miniaturized image sensing devices at a lower cost. For these reasons, CMOS image sensing devices are being developed for many applications including mobile devices.

SUMMARY

Various embodiments of the disclosed technology relate to an image sensing device that can capture a high dynamic range (HDR) image from a single exposure.

In one aspect, the disclosed technology can be implemented to provide an image sensing which includes: a substrate including first and second photoelectric conversion elements configured to generate photocharges corresponding to intensity of incident light corresponding to a first color; a first pixel including a first optical filter disposed over the first photoelectric conversion element to selectively transmits the light corresponding to the first color; a second pixel including a second optical filter disposed over the substrate to selectively transmit the light corresponding to the first color; and a first air layer disposed between the first optical filter and the first photoelectric conversion element to reflect the light incident upon the first optical filter.

In another aspect, the disclosed technology can be implemented to provide an image sensing device which includes a substrate; a first pixel supported by the substrate and including a first photoelectric conversion element config- ured to generate photocharge corresponding to an intensity of incident light corresponding to a first color and a first optical filter disposed over the first photoelectric conversion element to selectively transmit the light corresponding to the first color; and a second pixel supported by the substrate and including a second photoelectric conversion element configured to generate photocharge corresponding to an intensity of incident light corresponding to the first color and a second optical filter disposed over the second photoelectric conversion element to selectively transmit the light corresponding to the first color. The first optical filter and the first photoelectric conversion element are spaced from each other to form a gap filled with air as a first air layer to reflect light from the first optical filter.

In another aspect, the disclosed technology can be implemented to provide an image sensing device which includes: a substrate; first and second photoelectric conversion elements supported by the substrate and configured to detect incident light to generate photocharges corresponding to an intensity of light corresponding to a first color; a first pixel including a first optical filter disposed over the first photoelectric conversion element supported by the substrate to selectively transmit the light corresponding to the first color; a second pixel including a second optical filter disposed over the second photoelectric conversion element supported by the substrate to selectively transmit the light corresponding to the first color; and wherein the first optical filter is spaced from the first photoelectric conversion element to form a first air layer between the first optical filter and the first photoelectric conversion element and structured to reflect light from the first optical filter.

In yet another aspect, an image sensing device is provided to include a substrate including first, second, and third photoelectric conversion elements configured to generate photocharges corresponding to an intensity of incident light corresponding to a first color; and an optical filter array disposed over first, second, and third photoelectric conversion elements, and configured to include a first optical filter corresponding to the first photoelectric conversion element and a second optical filter corresponding to the second photoelectric conversion element, wherein the optical filter array includes a first air layer between the first optical filter and the first photoelectric conversion element to reflect light from the first optical filter.

DETAILED DESCRIPTION

This patent document provides implementations and examples of an image sensing device that includes optical filters adjacent to each other. In some implementations of the disclosed technology, an image sensing device can obtain a high dynamic range (HDR) image by capturing an image only once or from single exposure. The disclosed technology provides various implementations of an image sensing device which can obtain a high dynamic range (HDR) image without the need for a complicated structure.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Figure 1:
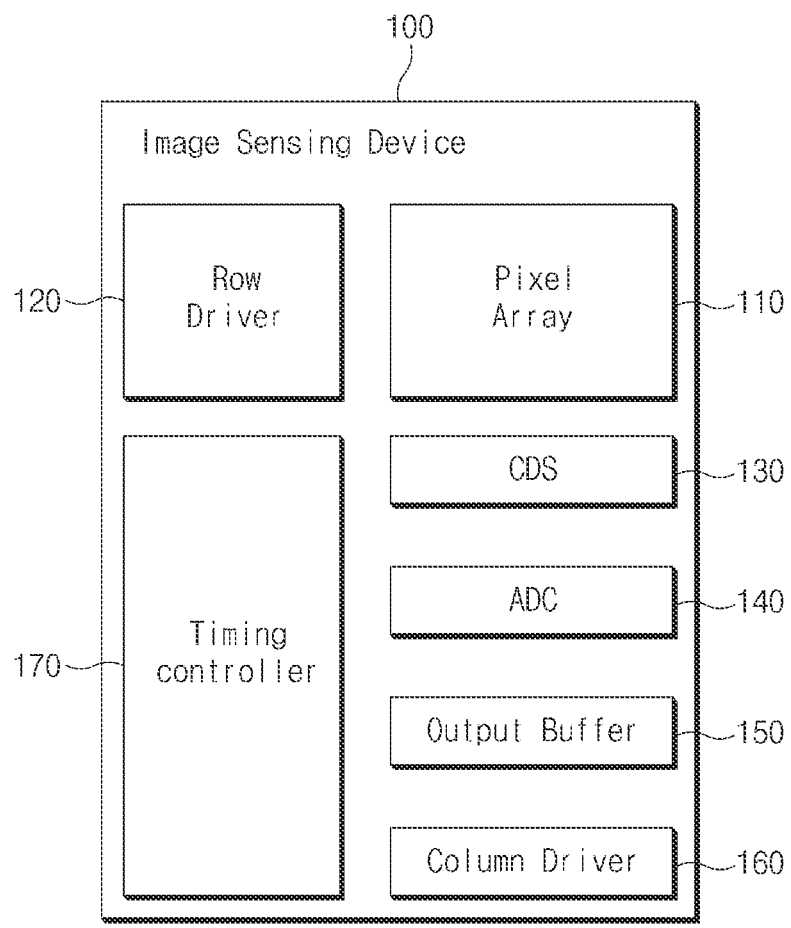
FIG. 1 is a block diagram illustrating an example of an image sensing device based on some implementations of the disclosed technology.

FIG. 1 is a block diagram illustrating an image sensing device according to an embodiment of the disclosed technology.

Referring to FIG. 1, the image sensing device 100 may include a pixel array 110, a row driver 120, a correlated double sampler (CDS) 130, an analog-digital converter (ADC) 140, an output buffer 150, a column driver 160 and a timing controller 170. The components of the image sensing device 100 illustrated in FIG. 1 are discussed by way of example only, and this patent document encompasses numerous other changes, substitutions, variations, alterations, and modifications.

The pixel array 110 may include a plurality of unit imaging pixels arranged in rows and columns. In one example, the plurality of unit imaging pixels can be arranged in a two dimensional pixel array including rows and columns. In another example, the plurality of unit imaging pixels can be arranged in a three dimensional pixel array. The plurality of unit pixels may convert an optical signal into an electrical signal on a unit pixel basis or a pixel group basis, where unit pixels in a pixel group share at least certain internal circuitry. The pixel array 110 may receive driving signals, including a row selection signal, a pixel reset signal and a transmission signal, from the row driver 120. Upon receiving the driving signal, corresponding imaging pixels in the pixel array 110 may be activated to perform the operations corresponding to the row selection signal, the pixel reset signal, and the transmission signal.

The row driver 120 may activate the pixel array 110 to perform certain operations on the imaging pixels in the corresponding row based on commands and control signals provided by controller circuitry such as the timing controller 170. In some implementations, the row driver 120 may select one or more imaging pixels arranged in one or more rows of the pixel array 110. The row driver 120 may generate a row selection signal to select one or more rows among the plurality of rows. The row decoder 120 may sequentially enable the pixel reset signal for resetting imaging pixels corresponding to at least one selected row, and the transmission signal for the pixels corresponding to the at least one selected row. Thus, a reference signal and an image signal, which are analog signals generated by each of the imaging pixels of the selected row, may be sequentially transferred to the CDS 130. The reference signal may be an electrical signal that is provided to the CDS 130 when a sensing node of an imaging pixel (e.g., floating diffusion node) is reset, and the image signal may be an electrical signal that is provided to the CDS 130 when photocharges generated by the imaging pixel are accumulated in the sensing node.

CMOS image sensors may use the correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after photocharges generated by incident light are accumulated in the sensing node so that only pixel output voltages based on the incident light can be measured. In some embodiments of the disclosed technology, the CDS 130 may sequentially sample and hold voltage levels of the reference signal and the image signal, which are provided to each of a plurality of column lines from the pixel array 110. That is, the CDS 130 may sample and hold the voltage levels of the reference signal and the image signal which correspond to each of the columns of the pixel array 110.

In some implementations, the CDS 130 may transfer the reference signal and the image signal of each of the columns as a correlate double sampling signal to the ADC 140 based on control signals from the timing controller 170.

The ADC 140 is used to convert analog CDS signals into digital signals. In some implementations, the ADC 140 may be implemented as a ramp-compare type ADC. The ramp-compare type ADC may include a comparator circuit for comparing the analog pixel signal with a reference signal such as a ramp signal that ramps up or down, and a timer counts until a voltage of the ramp signal matches the analog pixel signal. In some embodiments of the disclosed technology, the ADC 140 may convert the correlate double sampling signal generated by the CDS 130 for each of the columns into a digital signal, and output the digital signal. The ADC 140 may perform a counting operation and a computing operation based on the correlate double sampling signal for each of the columns and a ramp signal provided from the timing controller 170. In this way, the ADC 140 may eliminate or reduce noises such as reset noise arising from the imaging pixels when generating digital image data.

The ADC 140 may include a plurality of column counters. Each column of the pixel array 110 is coupled to a column counter, and image data can be generated by converting the correlate double sampling signals received from each column into digital signals using the column counter. In another embodiment of the disclosed technology, the ADC 140 may include a global counter to convert the correlate double sampling signals corresponding to the columns into digital signals using a global code provided from the global counter.

The output buffer 150 may temporarily hold the column-based image data provided from the ADC 140 to output the image data. In one example, the image data provided to the output buffer 150 from the ADC 140 may be temporarily stored in the output buffer 150 based on control signals of the timing controller 170. The output buffer 150 may provide an interface to compensate for data rate differences or transmission rate differences between the image sensing device 100 and other devices.

The column driver 160 may select a column of the output buffer upon receiving a control signal from the timing controller 170, and sequentially output the image data, which are temporarily stored in the selected column of the output buffer 150. In some implementations, upon receiving an address signal from the timing controller 170, the column driver 160 may generate a column selection signal based on the address signal and select a column of the output buffer 150, outputting the image data as an output signal from the selected column of the output buffer 150.

The timing controller 170 may control operations of the row driver 120, the ADC 140, the output buffer 150 and the column driver 160.

The timing controller 170 may provide the row driver 120, the column driver 160 and the output buffer 150 with a clock signal required for the operations of the respective components of the image sensing device 100, a control signal for timing control, and address signals for selecting a row or column. In an embodiment of the disclosed technology, the timing controller 170 may include a logic control circuit, a phase lock loop (PLL) circuit, a timing control circuit, a communication interface circuit and others.

Figure 2:
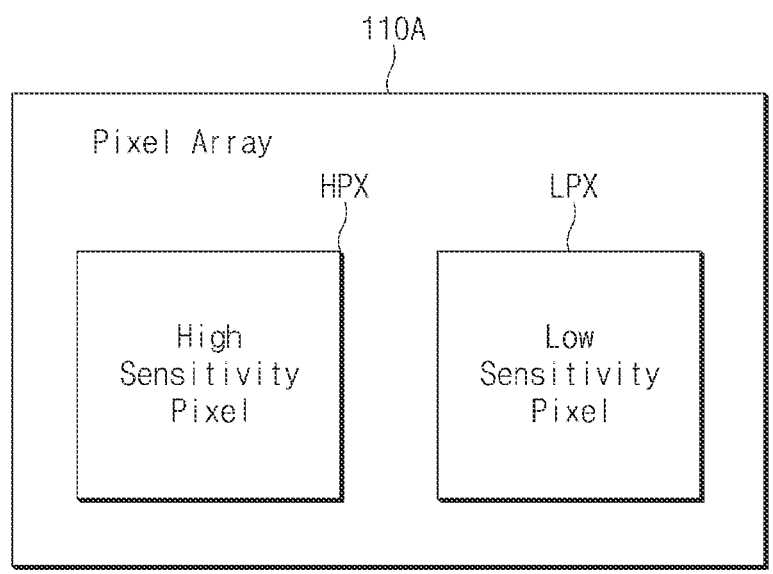
FIG. 2 is a schematic diagram illustrating an example of a pixel array shown in FIG. 1 based on some implementations of the disclosed technology.

FIG. 2 is a schematic diagram illustrating an example of a pixel array 110A shown in FIG. 1 based on some implementations of the disclosed technology.

Referring to FIG. 2, the pixel array 110A is an example of the pixel array 110 shown in FIG. 1. Although FIG. 2 illustrates the pixel array 110A as including only two types of image sensor pixels, i.e., a high-sensitivity pixel (HPX) and a low-sensitivity pixel (LPX), the pixel array 110A can include other types of image sensor pixels. In some implementations, each of the pixels included in the pixel array 110A may be either the high-sensitivity pixel (HPX) or the low-sensitivity pixel (LPX). The number of high-sensitivity pixels (HPX) and the number of low-sensitivity pixels (LPX) included in the pixel array 110A may vary.

The high-sensitivity pixel (HPX) may be structured to generate a greater response to an increase in the intensity of incident light than other types of pixels. Here, the responses may include electric charges or pixel signals that are generated by the high-sensitivity pixel (HPX) based on the intensity of incident light. In one example, the high-sensitivity pixel (HPX) may include a pixel that exhibits a relatively high sensitivity to incident light.

The low-sensitivity pixel (LPX) may include a pixel that is structured to generate less responses to an increase in the intensity of incident light. In other words, the low-sensitivity pixel (LPX) may include a pixel that exhibits a relatively low sensitivity to incident light.

Figure 3:
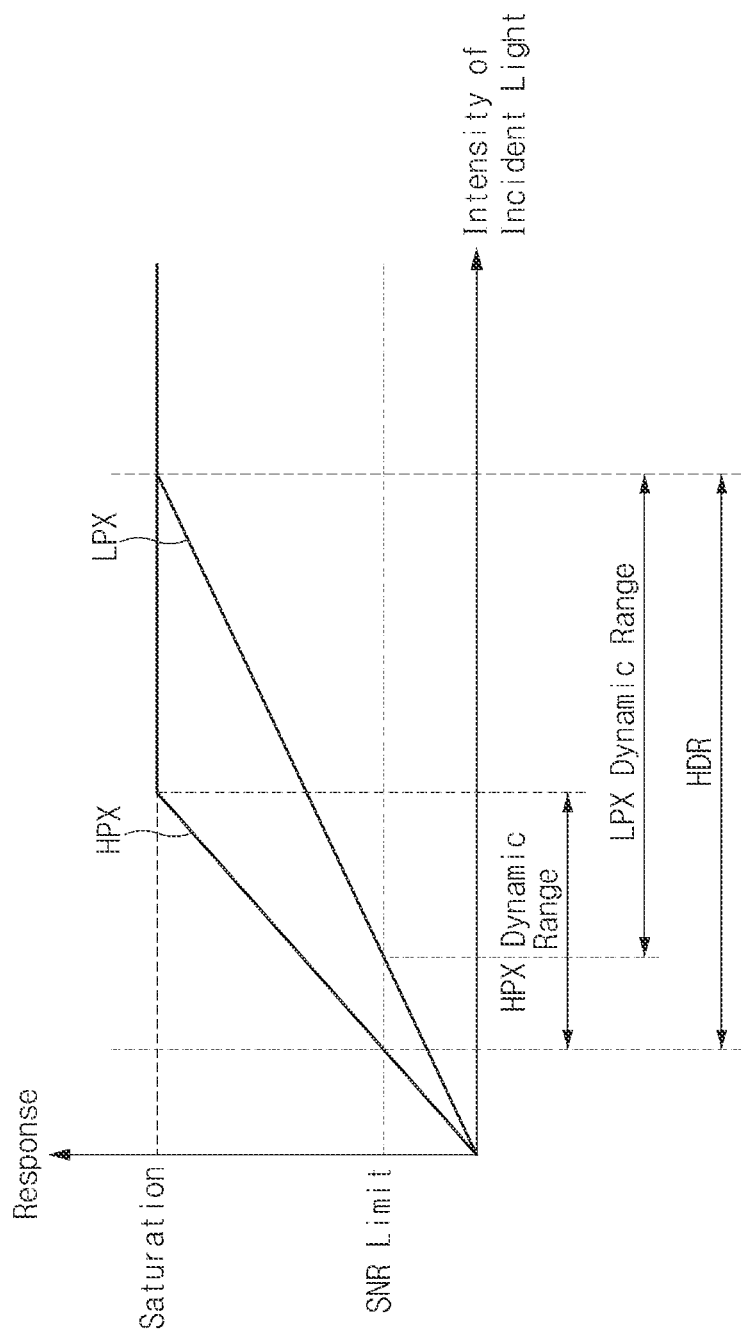
FIG. 3 is a graph illustrating an example of responses that vary depending on the intensity of light incident on image sensor pixels including a high-sensitivity pixel and a low-sensitivity pixel shown in FIG. 2 based on some implementations of the disclosed technology.

FIG. 3 is a graph illustrating an example of responses that vary depending on illuminance or the intensity of light incident on image sensor pixels including the high-sensitivity pixel (HPX) and the low-sensitivity pixel (LPX) shown in FIG. 2 based on some implementations of the disclosed technology.

FIG. 3 shows curves of a response of the high-sensitivity pixel (HPX) and a response of the low-sensitivity pixel (LPX) versus the illuminance or the intensity of incident light applied to the corresponding pixel.

Here, the response may have a signal-to-noise ratio (SNR) limit (e.g., an SNR threshold level) and a saturation level.

The signal-to-noise ratio (SNR) limit may include a threshold value of a response that can satisfy a predetermined reference SNR. The response less than the SNR limit may be an invalid response that cannot satisfy the reference SNR, and the response above the SNR limit may be a valid response that can satisfy the reference SNR. The reference SNR may be determined experimentally in consideration of characteristics of the image sensing device 100.

A saturation level may include a maximum response value that indicates the intensity of incident light. The saturation level may be determined based on how effectively the pixel (e.g., photoelectric conversion element) can convert the intensity of incident light into photocharges and how effectively a floating diffusion (FD) region can convert photocharges into electrical signals. As the intensity of incident light increases, the response may increase according to the intensity of incident light until reaching the saturation level. However, although the intensity of incident light increases after the response has reached the saturation level, the response does not increase beyond the saturation level and stays at the saturation level.

If the valid response of each pixel is defined as a response that can indicate the intensity of incident light while satisfying the reference SNR, the range of the intensity of incident light corresponding to the valid response of each pixel may be defined as a dynamic range of each pixel. For instance, the dynamic range of the pixel may include the range of the intensity of incident light where the pixel can have a valid response.

The response of the high-sensitivity pixel (HPX) may increase with a relatively higher slope in response to the increasing intensity of incident light. After reaching a saturation level, the response of the high-sensitivity pixel (HPX) may have a level corresponding to the saturation level regardless of the intensity of incident light.

The response of the low-sensitivity pixel (LPX) may increase with a relatively lower slope in response to the increasing intensity of incident light. After reaching a saturation level, the response of the low-sensitivity pixel (LPX) may have a level corresponding to the saturation level regardless of the intensity of incident light.

As illustrated in FIG. 3, a minimum value of a high-sensitivity pixel (HPX) dynamic range may be less than the minimum value of a low-sensitivity pixel (LPX) dynamic range, and a maximum value of the high-sensitivity pixel (HPX) dynamic range may be less than the maximum value of the low-sensitivity pixel (LPX) dynamic range. Therefore, in a low-illuminance range in which the intensity of incident light is relatively small, the high-sensitivity pixel (HPX) may be more suitably used to sense the intensity of incident light. In a high-illuminance range in which the intensity of incident light is relatively large, the low-sensitivity pixel (LPX) may be more suitably used to sense the intensity of incident light.

High dynamic range (HDR) can be obtained using both the response of the high-sensitivity pixel (HPX) suitable for the low-illuminance range and the response of the low-sensitivity pixel (LPX) suitable for the high-illuminance range. In other words, as compared to using only one of the high-sensitivity pixel (HPX) and the low-sensitivity pixel (LPX), the disclosed technology can be implemented in some embodiments to use both the high-sensitivity pixel (HPX) and the low-sensitivity pixel (LPX), allowing the pixel array 110A to have a high dynamic range (HDR) corresponding to a specific range from the minimum value of the HPX dynamic range to the maximum value of the LPX dynamic range. To this end, at least a portion of the HPX dynamic range and at least a portion of the LPX dynamic range may overlap each other.

In synthesizing a high dynamic range (HDR) image corresponding to the high dynamic range (HDR) using the high-sensitivity pixel (HPX) and the low-sensitivity pixel (LPX), the disclosed technology may be implemented in some embodiments to synthesize the HDR image by calculating (e.g., summing) the HPX response and the LPX response, and/or to form an image based on the HPX response at a low-illuminance level and an image based on the LPX response at a high-illuminance level.

In the image sensing device 100, the high-sensitivity pixel (HPX) and the low-sensitivity pixel (LPX) are simultaneously arranged in the pixel array 110A, such that the image sensing device 100 can synthesize the HDR image using an image acquired through only one exposure.

Figure 4:
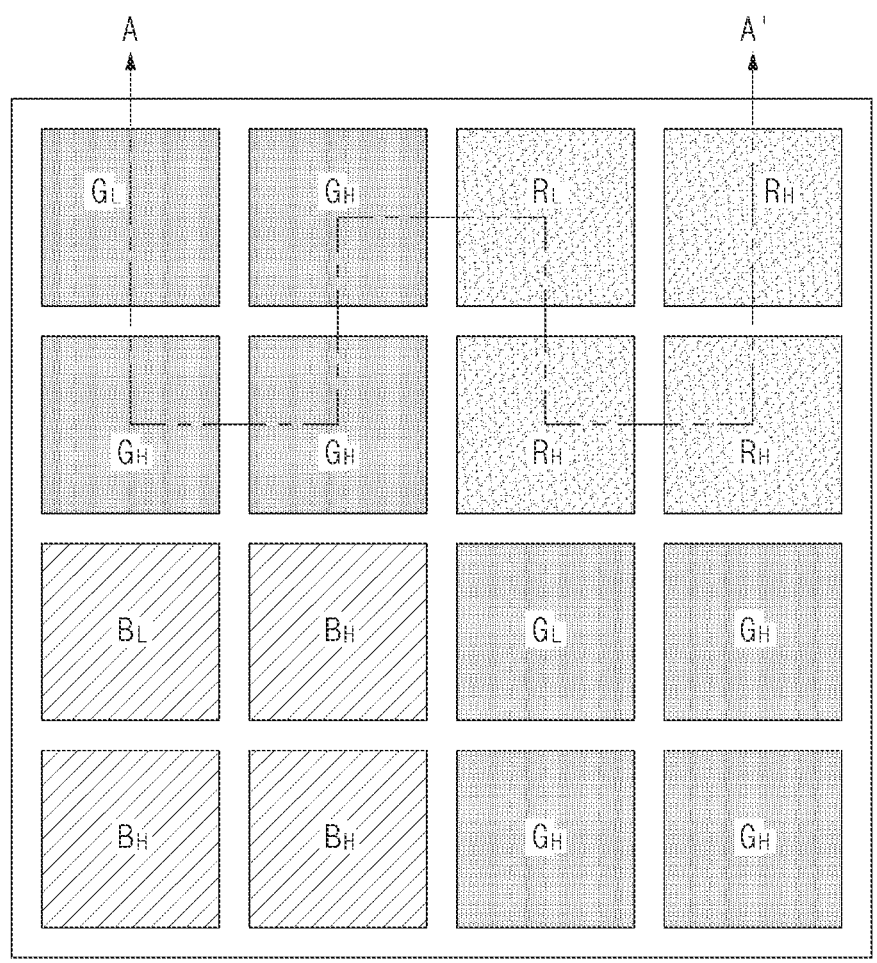
FIG. 4 is a schematic diagram illustrating an example of high-sensitivity pixels and low-sensitivity pixels arranged in the pixel array shown in FIG. 2 based on some implementations of the disclosed technology.

FIG. 4 is a schematic diagram illustrating an example of the high-sensitivity pixels (HPX) and the low-sensitivity pixels (LPX) arranged in the pixel array shown in FIG. 2 based on some implementations of the disclosed technology.

Referring to FIG. 4, the pixel array 110A-1 includes the high-sensitivity pixels (HPX) and the low-sensitivity pixels (LPX) arranged in a (4×4) matrix array that includes 4 rows and 4 columns. Although FIG. 4 shows the pixel array 110A-1 as including only 16 pixels for convenience of description, the pixel array 110A-1 may include more than 16 pixels. For example, those 16 pixels may be repeatedly arranged in row and column directions of the pixel array 110A-1.

The pixel array 110A-1 may include first to fourth pixel groups. Each pixel group includes a (2×2) matrix array.

Each of the first pixel group and the fourth pixel group may include one low-sensitivity green pixel ($G_L$) and three high-sensitivity green pixels ($G_H$). The first pixel group and the fourth pixel group may be diagonally arranged in the row or column direction of the pixel array 110A-1. In this case, the low-sensitivity green pixel ($G_L$) may include a low-sensitivity pixel (LPX) that generates a pixel signal indicating the intensity of light at a wavelength range corresponding to green light. The high-sensitivity green pixel ($G_H$) may include a high-sensitivity pixel (HPX) that generates a pixel signal indicating the intensity of light at a wavelength range corresponding to green light.

The second pixel group may be disposed at the right side of the first pixel group, and may include one low-sensitivity red pixel ($R_L$) and three high-sensitivity red pixels ($R_H$). The low-sensitivity red pixel ($R_L$) may include a low-sensitivity pixel (LPX) that generates a pixel signal indicating the intensity of light at a wavelength range corresponding to red light. The high-sensitivity green pixel ($R_H$) may include a high-sensitivity pixel (HPX) that generates a pixel signal indicating the intensity of light at a wavelength range corresponding to red light.

The third pixel group may be disposed below the first pixel group, and may include one low-sensitivity blue pixel ($B_L$) and three high-sensitivity blue pixels ($B_H$). The low-sensitivity blue pixel ($B_L$) may include a low-sensitivity pixel (LPX) that generates a pixel signal indicating the intensity of light at a wavelength range corresponding to blue light. The high-sensitivity blue pixel ($B_H$) may include a high-sensitivity pixel (HPX) that generates a pixel signal indicating the intensity of light at a wavelength range corresponding to blue light.

Although FIG. 4 shows the low-sensitivity pixel (LPX) as being disposed at a position corresponding to the left upper end of the (2×2) matrix in each of the first to fourth pixel groups, it should be noted that the low-sensitivity pixel (LPX) can also be disposed at other positions in other implementations. In addition, the number of low-sensitivity pixels (LPX) included in each of the first to fourth pixel groups may be set to 2 or 3.

Each of the first to fourth pixel groups may include four pixels having the same color, and the first to fourth pixel groups may be arranged in a Bayer pattern. Such arrangement structure may be defined as a quad Bayer pattern structure.

Figure 5:
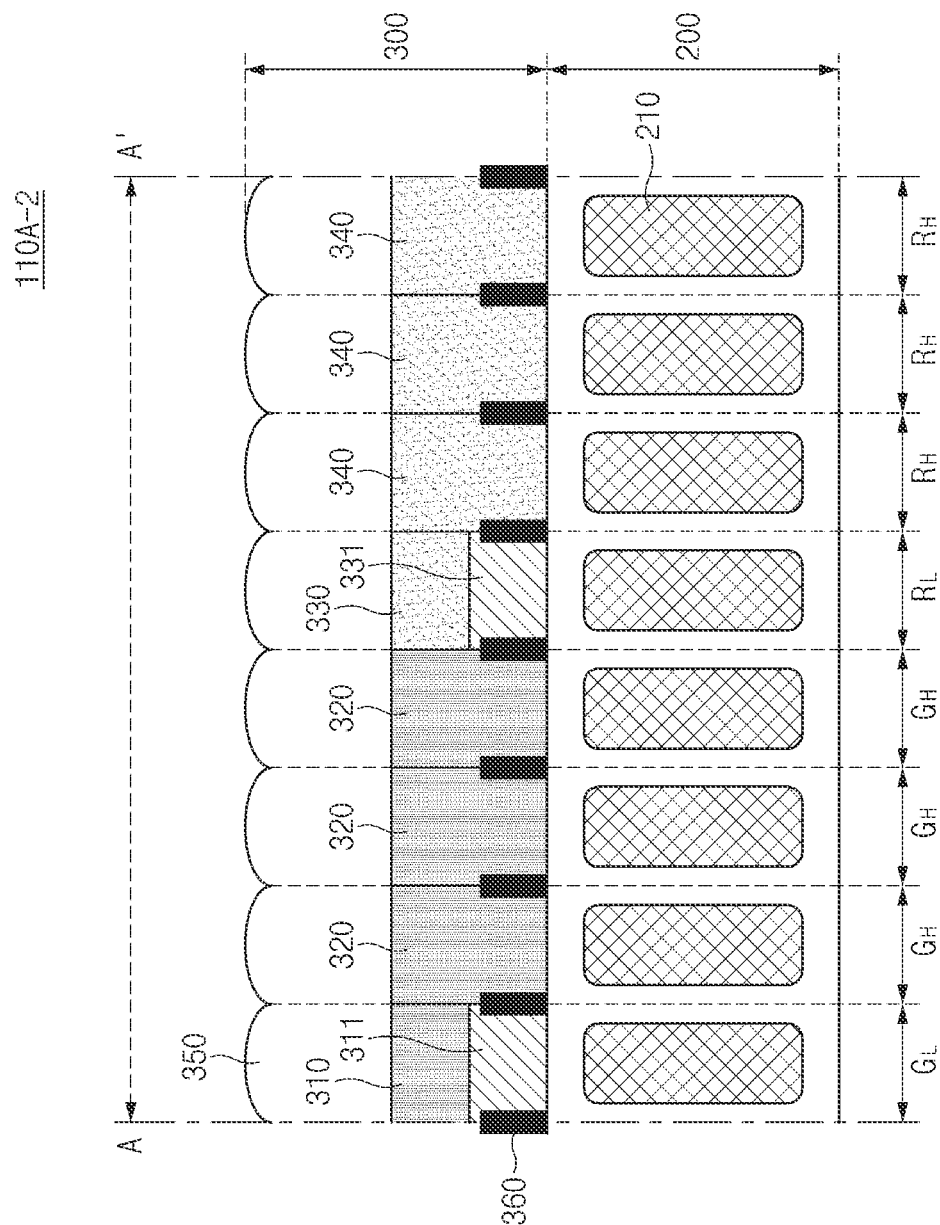
FIG. 5 is a cross-sectional view illustrating an example of image sensor pixels taken along a first line shown in FIG. 4 based on some implementations of the disclosed technology.

FIG. 5 is a cross-sectional view illustrating an example of image sensor pixels taken along a first line A-A' shown in FIG. 4 based on some implementations of the disclosed technology.

In more detail, FIG. 5 is a cross-sectional view 110A-2 illustrating pixels taken along the first line A-A' shown in FIG. 4.

The cross-sectional view 110A-2 includes a substrate 200 and a light receiving layer 300 arranged over the substrate 200. In addition, the cross-sectional view 110A-2 may include pixels $G_L$, $G_H$, $R_L$, and $R_H$ consecutively arranged along the first line A-A'.

The substrate 200 may include a top surface and a bottom surface facing away from each other. The bottom surface of the substrate 200 may be defined as a front side, and the top surface of the substrate 200 may be defined as a back side, for convenience of description. In one example, the substrate 200 may be a P-type or N-type bulk substrate. In another example, the substrate 200 may be a substrate that is formed by growing a P-type or N-type epitaxial layer on the P-type bulk substrate. In another example, the substrate 200 may be a substrate that is formed by growing a P-type or N-type epitaxial layer on the N-type bulk substrate.

The substrate 200 may include a plurality of photoelectric conversion elements 210. The photoelectric conversion elements 210 may be respectively disposed in the pixels $G_L$, $G_H$, $R_L$, and $R_H$, and may generate photocharges based on the intensity of incident light. Each of the photoelectric conversion elements 210 may be formed as an N-type doped region through ion implantation of N-type ions. In some implementations, the photoelectric conversion element 210 may be formed by stacking a plurality of doped regions. In this case, a lower doped region may be formed by implantation of $N^+$ ions, and an upper doped region may be formed by implantation of $N^-$ ions. The photoelectric conversion element 210 may a light receiving region that is sufficiently large to increase a fill factor that is associated with light reception (Rx) efficiency. In some implementations, a device isolation layer (not shown) disposed between photoelectric conversion elements 210 of adjacent pixels ($G_L$, $G_H$, $R_L$, $R_H$) may be formed to be etched at a first depth in a vertical direction, so that the device isolation layer can electrically or optically isolate adjacent pixels from each other.

Photocharges accumulated in the photoelectric conversion elements 210 may be converted into pixel signals through a readout circuit connected to the photoelectric conversion elements 210 and transfer the pixel signals to the column line. In some implementations, the readout circuit may include a floating diffusion (FD) node, a transfer transistor, a reset transistor, a source follower transistor, and a selection transistor.

The floating diffusion (FD) node may include a region that is structured to receive photocharges from the photoelectric conversion elements 210 and accumulate the photocharges therein. The transfer transistor may transfer the photocharges accumulated in the photoelectric conversion elements 210 to the floating diffusion (FD) node in response to a transmission (Tx) signal received from the row driver 120. The reset transistor may reset the floating diffusion (FD) node to a reset voltage (e.g., a power-supply voltage) in response to a pixel reset signal received from the row driver 120. The source follower transistor may convert a voltage of the floating diffusion (FD) node connected to a gate terminal thereof into an electrical signal, and may output the electrical signal to the selection transistor. The selection transistor may transmit the electrical signal received from the source follower transistor to the column line in response to a row selection signal received from the row driver 120. Here, the electrical signal transmitted to the column line by the selection transistor may serve as a pixel signal.

The light receiving layer 300 may receive light incident on the image sensing device 100 and the incident light reaches the substrate 200. The light receiving layer 300 may include first optical filters 310 and 330, low-index layers such as regions 311 and 331 that are filled with air as air layers 311 and 331, second optical filters 320 and 340, a plurality of microlenses 350, and a plurality of optical grid structures 360.

The first optical filter 310 may be disposed over the corresponding pixel ($G_L$), and the first optical filer 330 may be disposed over the corresponding pixel ($R_L$). The second optical filters 320 and 340 may be disposed over the corresponding pixels $G_H$ and $R_H$, respectively. In some implementations, each of the second optical filters 320 may be disposed over the corresponding pixel ($G_H$), and each of the second optical filters 340 may be disposed over the corresponding pixel ($R_H$). The first optical filters 310 and 330 and the second optical filters 320 and 340 may be formed between the optical grid structures 360 adjacent to each other at an upper portion of the substrate 200, and may selectively transmit light (e.g., red light, green light, blue light, magenta light, yellow light, cyan light, infrared (IR) light) at a certain wavelength band. In one example, each optical filter may correspond to a certain wavelength band of light. For example, each of the first optical filters 310 and 330 and the second optical filters 320 and 340 may include a colored photosensitive material corresponding to a specific color. As another example, each of the first optical filters 310 and 330 and the second optical filters 320 and 340 may include thin film layers that are alternately arranged. The optical filters are arranged in an optical filter array corresponding to the pixels arranged in rows and columns in a matrix array.

In FIG. 5, each of the first optical filter 310 and the second optical filter 320 may be a green color filter that selectively transmits light at a wavelength band corresponding to a green color. In addition, the first optical filter 310 may be disposed in the low-sensitivity green pixel ($G_L$), and the second optical filter 320 may be disposed in the high-sensitivity green pixel ($G_H$).

In FIG. 5, each of the first optical filter 330 and the second optical filter 340 may be a red color filter that selectively transmits light at a wavelength band corresponding to a red color. In addition, the first optical filter 330 may be disposed in the low-sensitivity red pixel ($R_L$), and the second optical filter 340 may be disposed in the high-sensitivity red pixel ($R_H$).

In some implementations of the disclosed technology, optical filters corresponding to low-sensitivity pixels include a low index layer such as an air layer. In one example, a selected optical filter can be positioned to be spaced from the corresponding underlying photoelectric conversion element to form an air layer that receives light that passes through the optical filter. For example, as shown in FIG. 5, the first optical filter 310 may include the air layer 311, and the first optical filter 330 may include the air layer 331. The air layer 311 may be disposed below the first optical filter, and the air layer 331 may be disposed below the first optical filter 330. For instance, the air layer 311 may be disposed between the first optical filter 310 and the photoelectric conversion element 210, and the air layer 331 may be disposed between the first optical filter 330 and the photoelectric conversion element 210. The air layers 311 and 331 may be formed over a top surface of the substrate 200. A bottom surface of the first optical filter 310 may be connected to a top surface of the air layer 311, and a bottom surface of the first optical filter 330 may be connected to a top surface of the air layer 331. A bottom surface of the first optical filter 320 may be connected to the top surface of the substrate 200, and a bottom surface of the first optical filter 340 may be connected to the top surface of the substrate 200. Each of the air layers 311 and 331 may be formed between the optical grid structures 360. Each of the air layers 311 and 331 may have a relatively greater height than the optical grid structure 360, the air layer 311 may be lower in height than the first optical filter 310, and the air layer 331 may be lower in height than the first optical filter 330. Each of the air layers 311 and 331 may include a low-index layer such as a layer that includes a hollow or void portion (e.g., a portion filled with air) formed in the first optical filters 310 and 330. For example, the air layer 311 may be formed by filling a hollow in the first optical filter 310 with air, and the air layer 330 may be formed by filling a hollow in the first optical filter 330 with air.

Each of the optical filters may absorb a relatively small amount of light rays at a selected wavelength band to be transmitted, and may absorb a relatively large amount of light rays at wavelength bands other than the selected wavelength band, such that the optical filter can selectively transmit light corresponding to the selected wavelength band. In some implementations of the disclosed technology, the combined thickness of the first optical filter 310 and the air layer 311 and the combined thickness of the first optical filter 330 and the air layer 331 may be identical to the thickness of the second optical filters 320 and 340. The combination of the first optical filter 310 and the air layer 311 and the combination of the first optical filter 330 and the air layer 331 correspond to low-sensitivity pixels (e.g., a low-sensitivity green pixel ($G_L$, a low-sensitivity red pixel ($R_L$)).

In such designs where the low-index layers or air layers 311 and 331 are respectively formed in the optical filters 310 and 330, light incident upon the optical filters 310 and 330 that enters the underlying air layers 311 and 331 upon transmission through the optical filters 310 and 330 may be partially or totally reflected by interfaces of the air layers 311 and 331 with surrounding layers with higher refractive indices than that of the air layers 311 and 331 and such reflection in the air layers 311 and 331 can increase the overall reflection of the incident light. Therefore, the air layers 311 and 331 formed in the optical filters 310 and 330 may decrease the overall light transmittance at the incident light at selected wavelength bands of optical filters 310 and 330. The degree of the light transmittance can be used to obtain information of a ratio of the light incident upon the optical filters 310 and 330 and the light transmitted through the optical filters 310 and 330.

Therefore, the light transmittance of the first optical filter 310 or 330 including the air layer 311 or 331 at the selected wavelength band of the optical filter 310 or 330 may be lower than that of the second optical filter 320 or 340, which does not include the low-index layer or air layer 311 or 331 and thus exhibits a smaller refractive index difference at their interfaces. That is, when light beams having the same intensity are incident upon the first optical filters 310 and 330 and the second optical filters 320 and 340, the intensity of light at a selected wavelength band that has passes through the first optical filters 310 and 330 may be less than the intensity of light at the selected wavelength band that has passed through the second optical filters 320 and 340.

In addition, the intensity of light corresponding to the selected wavelength band passing through the first optical filters 310 and 330 may increase with a relatively lower slope in response to the increasing intensity of incident light. The intensity of light corresponding to the transmission wavelength band passing through the second optical filters 320 and 340 may increase with a relatively higher slope in response to the increasing intensity of incident light.

The intensity of light corresponding to the transmission wavelength band having penetrated each of the first optical filters 310 and 330 and the second optical filters 320 and 340 may be converted into a pixel signal by the photoelectric conversion element 210 and the readout circuit. As a result, the response of the pixel including the first optical filter 310 or 330 may follow the response of the low-sensitivity pixel (LPX) shown in FIG. 3, and the response of the pixel including the second optical filter 320 or 340 may follow the response of the high-sensitivity pixel (HPX) shown in FIG. 3.

Accordingly, the pixel including the first optical filter 310 or 330 may correspond to the low-sensitivity pixel (LPX), and the pixel including the second optical filter 320 or 340 may correspond to the high-sensitivity pixel (HPX).

The image sensing device 100 based on some implementations of the disclosed technology may include the air layers 311 and 331 that is inserted into the first optical filters 310 and 330 to allow incident light applied to the first optical filter 310 and incident light applied to the first optical filter 330 to have different reflectivities, making it possible to implement the low-sensitivity pixel (LPX) and the high-sensitivity pixel (HPX) in one pixel array, such that the image sensing device 100 can form a high dynamic range (HDR) image using only one image.

By way of example, the air layer 311 is inserted into the first optical filter 310 included in the low-sensitivity red pixel ($R_L$), the air layer 331 is inserted into the first optical filter 330 included in the low-sensitivity blue pixel ($B_L$), and the air layers 311 and 331 are not included in the second optical filters 320 and 340 included in the high-sensitivity green pixel ($G_H$), the high-sensitivity red pixel ($R_H$), and the high-sensitivity blue pixel ($B_H$).

The microlenses 350 may be formed over the optical filters 310 to 340 to converge incident light, thereby increasing the light reception (Rx) efficiency of the photoelectric conversion element 210.

Each of the optical grid structures 360 may be formed between the adjacent optical filters 310, 320, 330, and 340 at an upper portion of the substrate region 200. The optical grid structures 360 may prevent light incident upon the optical filters 310 to 340 from interfering with adjacent pixels, thereby minimizing optical crosstalk between the adjacent pixels.

Figure 6:
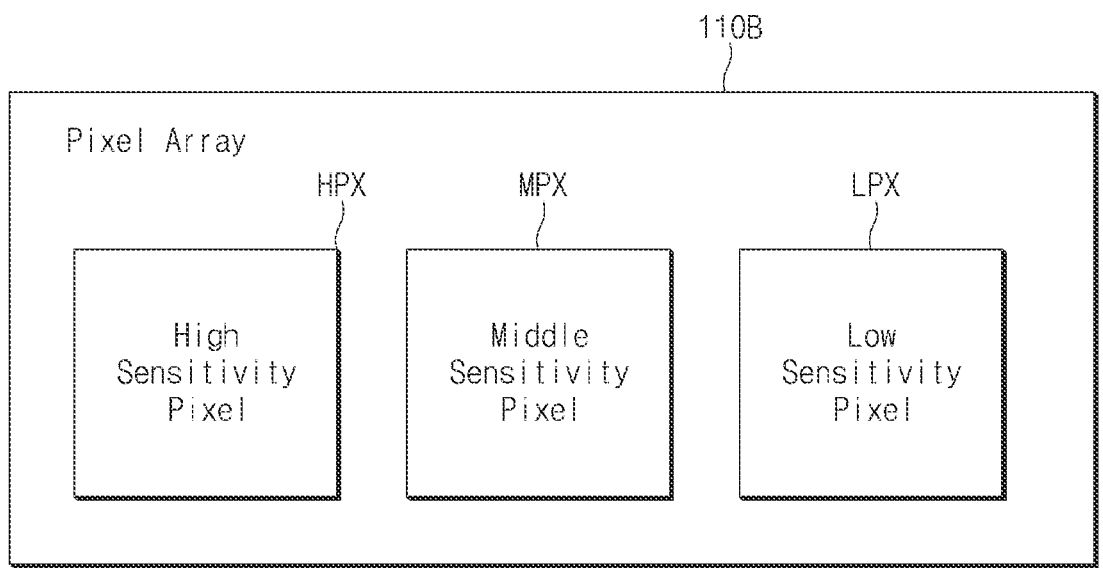
FIG. 6 is a schematic diagram illustrating another example of the pixel array shown in FIG. 1 based on some implementations of the disclosed technology.

FIG. 6 is a schematic diagram illustrating another example of the pixel array shown in FIG. 1 based on some implementations of the disclosed technology.

Referring to FIG. 6, the pixel array 110B is an example of the pixel array 110 shown in FIG. 1. Although FIG. 6 illustrates the pixel array 110B as including three types of image sensor pixels, i.e., a high-sensitivity pixel (HPX), a medium-sensitivity pixel (MPX), and a low-sensitivity pixel (LPX), the pixel array 110B can include other types of image sensor pixels. In some implementations, each of the pixels included in the pixel array 110B may be either the high-sensitivity pixel (HPX), the medium-sensitivity pixel (MPX), or the low-sensitivity pixel (LPX). The number of high-sensitivity pixels (HPX), the number of medium-sensitivity pixels (MPX), and the number of low-sensitivity pixels (LPX) included in the pixel array 110B may vary.

The high-sensitivity pixel (HPX) and the low-sensitivity pixel (LPX) shown in FIG. 6 are substantially identical to those of FIG. 2, and as such a detailed description thereof will herein be omitted for convenience of description. The medium-sensitivity pixel (MPX) may be structured to generate a greater response to an increase in the intensity of incident light than that of the low-sensitivity pixel (LPX) and generate a smaller response than that of the high-sensitivity pixel (HPX).

Figure 7:
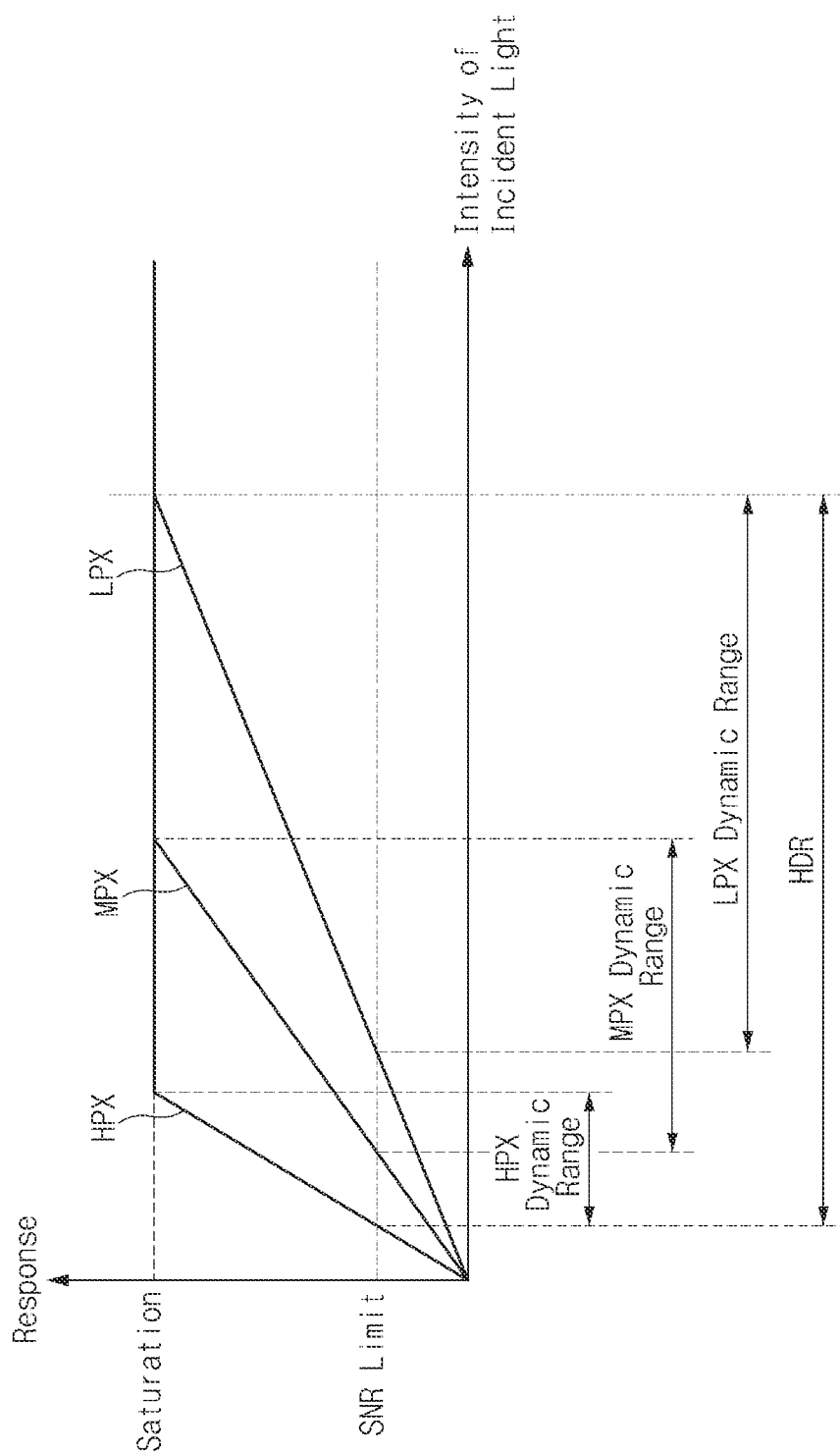
FIG. 7 is a graph illustrating an example of responses that vary depending on the intensity of light incident on image sensor pixels including a high-sensitivity pixel, a medium-sensitivity pixel, and a low-sensitivity pixel shown in FIG. 6 based on some implementations of the disclosed technology.

FIG. 7 is a graph illustrating an example of responses that vary depending on the intensity of light incident on image sensor pixels including the high-sensitivity pixel (HPX), the medium-sensitivity pixel (MPX), and the low-sensitivity pixel (LPX) shown in FIG. 6 based on some implementations of the disclosed technology.

FIG. 7 shows curves of a response of the high-sensitivity pixel (HPX), a response of the medium-sensitivity pixel (MPX), and a response of the low-sensitivity pixel (LPX) versus the illuminance or the intensity of incident light applied to the corresponding pixel. The HPX response and the LPX response shown in FIG. 7 are substantially identical to those of FIG. 3, and as such a detailed description thereof will herein be omitted for convenience of description.

The response of the medium-sensitivity pixel (MPX) shows the characteristics that the amount of increase in the response that is caused by an increase in the intensity of incident light is higher than that of the low-sensitivity pixel (LPX) and is less than that of the high-sensitivity pixel (HPX). In some implementations, the response of the medium-sensitivity pixel (MPX) may increase with a slope that is higher than that of the low-sensitivity pixel (LPX) and is lower than that of the high-sensitivity pixel (HPX) in response to the increasing intensity of incident light. The response of the medium-sensitivity pixel (MPX) may reach a saturation level, and may thus have a level corresponding to the saturation level regardless of the intensity of incident light.

As illustrated in FIG. 7, in order to improve a high dynamic range (HDR) from that of FIG. 3, the amount of increase in the response that is cause by an increase in the intensity of incident light of the low-sensitivity pixel (LPX) may decrease, or the amount of increase in the response that is caused by an increase in the intensity of incident light of the high-sensitivity pixel (HPX) may increase. In this case, the minimum value of the low-sensitivity pixel (LPX) dynamic range may exceed the maximum value of the high-sensitivity pixel (HPX) dynamic range. For instance, a gap may occur between the LPX dynamic range and the HPX dynamic range. As a result, the image sensing device 100 may not obtain a valid response at a level of illuminance corresponding to such a gap.

However, the medium-sensitivity pixel (MPX) dynamic range in which the amount of increase in the response that is caused by an increase in the intensity of incident light is higher than that of the low-sensitivity pixel (LPX) and is less than that of the high-sensitivity pixel (HPX) may have the maximum value higher than the minimum value of the low-sensitivity pixel (LPX) dynamic range, and may have the minimum value less than the maximum value of the HPX dynamic range. As a result, the MPX dynamic range may cover the gap between the LPX dynamic range and the HPX dynamic range.

High dynamic range (HDR) can be implemented using a response of the high-sensitivity pixel (HPX) suitable for the low-illuminance range, a response of the medium-sensitivity pixel (MPX) suitable for the medium-illuminance range, and a range of the low-sensitivity pixel (LPX) suitable for the low-illuminance range. In other words, as compared to using the high-sensitivity pixel (HPX) and the low-sensitivity pixel (LPX), the disclosed technology can be implemented in some embodiments to use the high-sensitivity pixel (HPX), the medium-sensitivity pixel (MPX), and the low-sensitivity pixel (LPX) simultaneously, allowing the pixel array 110B to have a high dynamic range (HDR) corresponding to a specific range from the minimum value of the HPX dynamic range to the maximum value of the LPX dynamic range without causing the gap between the HPX dynamic range and the LPX dynamic range. To this end, at least a portion of the HPX dynamic range, at least a portion of the MPX dynamic range, and at least a portion of the LPX dynamic range may overlap each other.

In synthesizing the HDR image corresponding to the high dynamic range (HDR) using the high-sensitivity pixel (HPX), the medium-sensitivity pixel (MPX), and the low-sensitivity pixel (LPX), the disclosed technology may be implemented in some embodiments to synthesize the HDR image by calculating (e.g., summing) the HPX response, the MPX response, and the LPX response, and/or to form an image based on the HPX response at a low-illuminance level, an image based on the MPX response at a medium-illuminance level, and an image based on the LPX response at a high-illuminance level.

In the image sensing device 100, the high-sensitivity pixel (HPX), the medium-sensitivity pixel (MPX), and the low-sensitivity pixel (LPX) are simultaneously arranged in the pixel array 110B, such that the image sensing device 100 can synthesize the HDR image using an image acquired through only one exposure.

Figure 8:
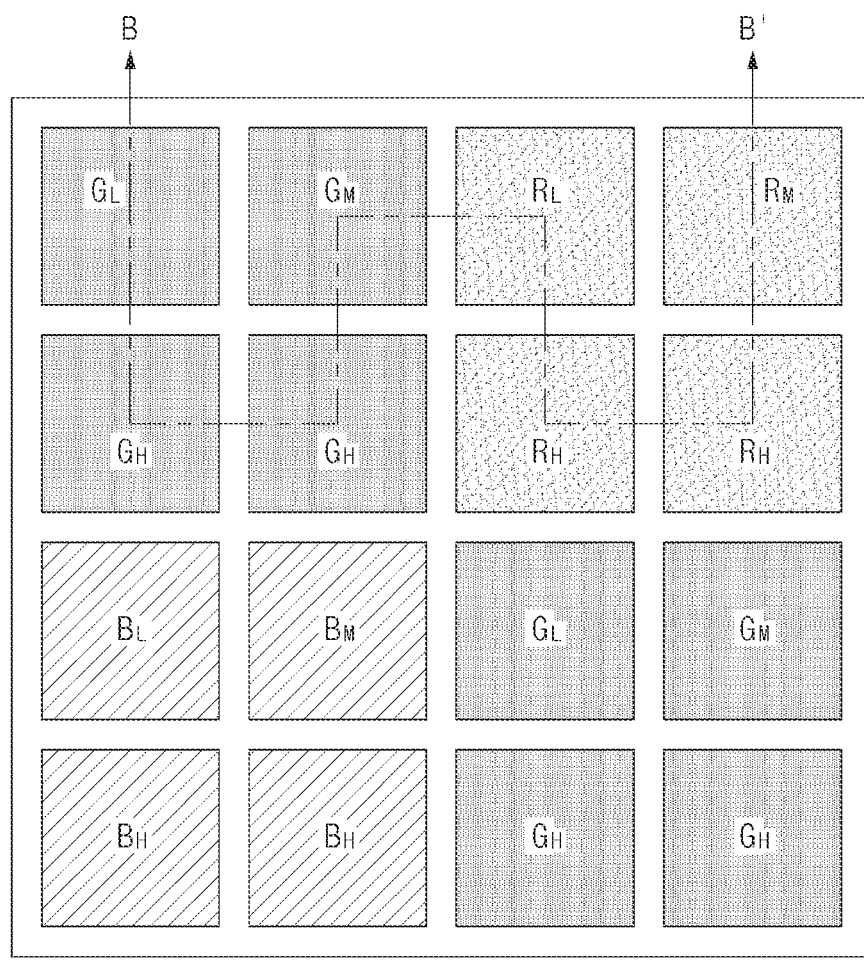
FIG. 8 is a schematic diagram illustrating an example of arrangement of a high-sensitivity pixel, a medium-sensitivity pixel, and a low-sensitivity pixel in the pixel array shown in FIG. 6 based on some implementations of the disclosed technology.

FIG. 8 is a schematic diagram illustrating an example of arrangement of the high-sensitivity pixel (HPX), the medium-sensitivity pixel (MPX), and the low-sensitivity pixel (LPX) in the pixel array shown in FIG. 6 based on some implementations of the disclosed technology.

Referring to FIG. 8, the pixel array 110B-1 includes the high-sensitivity pixels (HPX), the medium-sensitivity pixels (MPX), and the low-sensitivity pixels (LPX) arranged in a (4×4) matrix array including 4 rows and 4 columns. Although FIG. 8 shows the pixel array 110B-1 as including only 16 pixels for convenience of description, the pixel array 110B-1 may include more than 16 pixels. For example, those 16 pixels may be repeatedly arranged in row and column directions of the pixel array 110B-1.

The pixel array 110B-1 may include fifth to eighth pixel groups. Each pixel group includes a (2×2) matrix array.

Each of the fifth pixel group and the eighth pixel group may include one low-sensitivity green pixel ($G_L$), one medium-sensitivity green pixel ($G_M$), and two high-sensitivity green pixels ($G_H$). The fifth pixel group and the eighth pixel group may be diagonally arranged in the row or column direction of the pixel array 110B-1. In this case, the medium-sensitivity green pixel ($G_M$) may include a medium-sensitivity pixel (MPX) that generates a pixel signal indicating the intensity of light at a wavelength range corresponding to green light.

The sixth pixel group may be disposed at the right side of the fifth pixel group, and may include one low-sensitivity red pixel ($R_L$), one medium-sensitivity red pixel ($R_M$), and two high-sensitivity red pixels ($R_H$). The medium-sensitivity red pixel ($R_M$) may include a medium-sensitivity pixel (MPX) that generates a pixel signal indicating the intensity of light at a wavelength range corresponding to red light.

The seventh pixel group may be disposed below the fifth pixel group, and may include one low-sensitivity blue pixel ($B_L$), one medium-sensitivity blue pixel ($B_M$), and two high-sensitivity blue pixels ($B_H$). The medium-sensitivity blue pixel ($B_M$) may include a medium-sensitivity pixel (MPX) that generates a pixel signal indicating the intensity of light at a wavelength range corresponding to blue light.

Although FIG. 8 shows the low-sensitivity pixel (LPX) as being disposed at a position corresponding to the left upper end of the (2×2) matrix in each of the fifth to eighth pixel groups and the medium-sensitivity pixel (MPX) is disposed at a position corresponding to the right upper end of the (2×2) matrix in each of the fifth to eighth pixel groups, it should be noted that the low-sensitivity pixel (LPX) and the medium-sensitivity pixel (MPX) can also be disposed at other positions in other implementations. In addition, the number of low-sensitivity pixels (LPX) included in each of the fifth to eighth pixel group or the number of medium-sensitivity pixels (MPX) included in each of the fifth to eighth pixel group may be set to 2.

Figure 9:
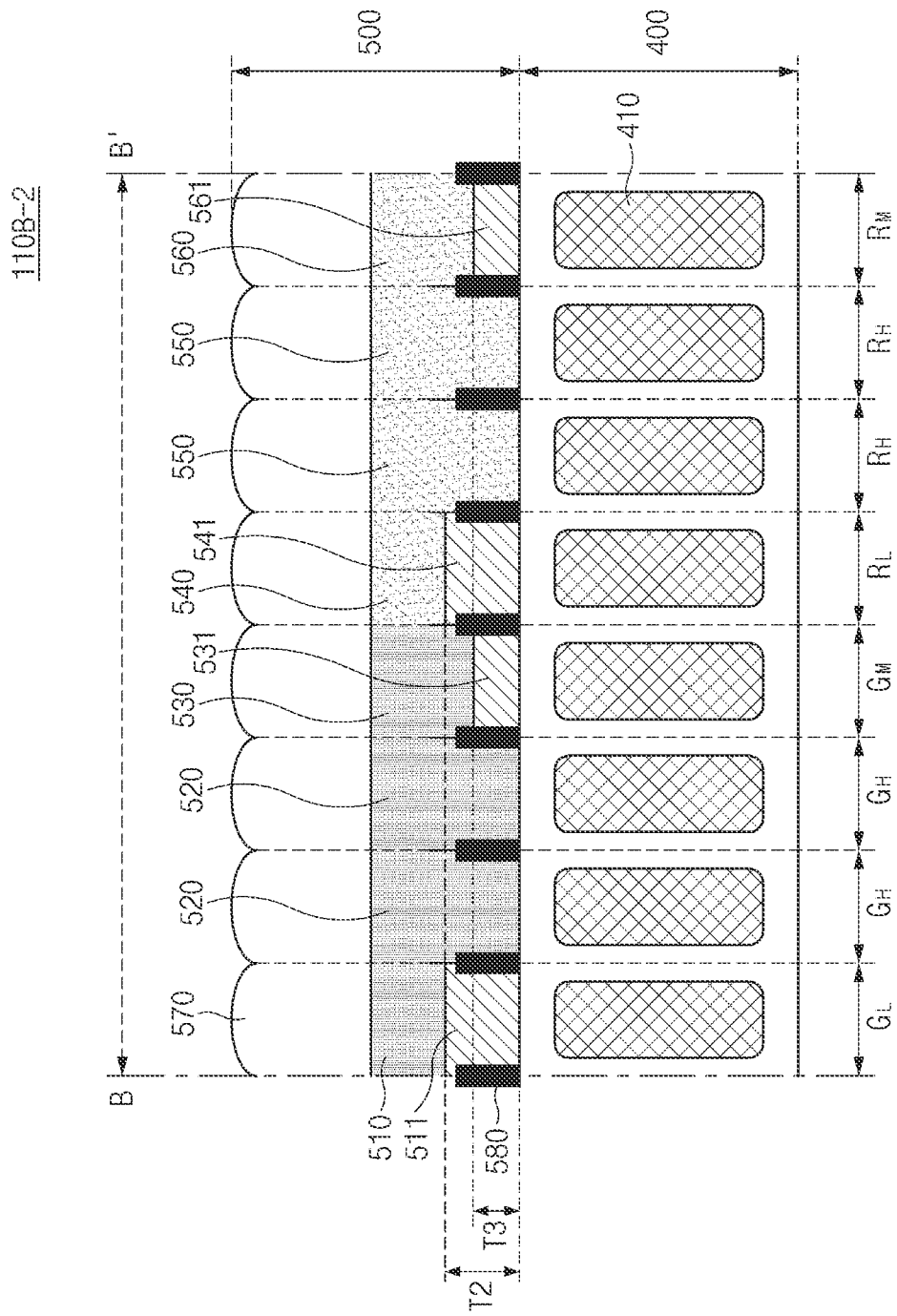
FIG. 9 is a cross-sectional view illustrating an example of image sensor pixels taken along a second line shown in FIG. 8 based on some implementations of the disclosed technology.

FIG. 9 is a cross-sectional view illustrating an example of image sensor pixels taken along a second line B-B' shown in FIG. 8 based on some implementations of the disclosed technology.

In more detail, FIG. 9 is a cross-sectional view 110B-2 illustrating pixels that are taken along the second line B-B' shown in FIG. 8 and are included in the fifth and sixth pixel groups.

The cross-sectional view 110B-2 includes a substrate 400 and a light receiving layer 500 arranged over the substrate 400. In addition, the cross-sectional view 110B-2 may include pixels $G_L$, $G_H$, $G_M$, $R_L$, and $R_H$ consecutively arranged along the second line B-B'. The substrate 400 and the light receiving layer 500 shown in FIG. 8 may be substantially identical in structure and function to the substrate 200 and the light receiving layer 300 shown in FIG. 5, and as such a detailed description thereof will herein be omitted for convenience of description.

The light receiving layer 500 may include a plurality of first optical filters 510 and 540, a plurality of second optical filters 520 and 550, a plurality of third optical filters 530 and 560, a plurality of air layers 511, 531, 541, and 561, a plurality of microlenses 570, and a plurality of optical grid structures 580. Unlike the light receiving layer 300 shown in FIG. 5, the light receiving layer 500 may further include the third optical filters 530 and 560.

The air layer 511, 531, 541, or 561 may be disposed between the photoelectric conversion element 410 and the first optical filter 510, 530, 540, or 560. Each of the air layers 511, 531, 541, and 561 may be formed over a top surface of the substrate 400. The bottom surface of each of the first optical filters 510, 530, 540, and 560 may be in contact with or connected to the top surface of each of the air layers 511, 531, 541, and 561. The bottom surface of each of the first optical filters 520 and 550 may be in contact with or connected to the top surface of the substrate 400. The air layers 531 and 561 may include the same material and function as the air layers 511 and 541, but each of the air layers 531 and 561 may have a smaller thickness than each of the air layers 511 and 541.

Each of the air layers 531 and 561 may include a low index material such as air, and may include a hollow or void portion formed in the first optical filters 310 and 330. In this case, the air layer 531 may be disposed in the medium-sensitivity green pixel ($G_M$). In addition, the air layer 561 may be disposed in the medium-sensitivity red pixel ($R_M$).

A thickness T2 of each of the air layers 511 and 541 may be smaller than a thickness of each of the first optical filters 510 and 540, a thickness of each of the second optical filters 520 and 550, or a thickness of each of the third optical filters 530 and 560. A thickness T3 of each of the air layers 531 and 561 may be smaller than the thickness T2 of each of the air layers 511 and 541.

The light transmittance of light of the third optical filter 530 or 560 including the air layer 531 or 561 at the selected wavelength band may be higher than that of the first optical filter 510 or 540, which does not include the air layer 511 or 541, and may be lower than that of the second optical filter 520 or 550, which does not include the air layer 511, 531, 541, or 561.

When light beams having the same intensity are incident upon the first optical filters 510 and 540, the second optical filters 520 and 540, and the third optical filters 530 and 560, the intensity of light at a selected wavelength band passing through the third optical filters 530 and 560 may be greater than the intensity of light having penetrated the first optical filters 510 and 540, and may be less than the intensity of light passing through the second optical filters 520 and 550.

In addition, the intensity of light corresponding to a transmission wavelength band passing through the third optical filters 530 and 560 may increase with a slope between a slope of the first optical filters 510 and 540 and a slope of the second optical filters 520 and 550 in response to the increasing intensity of incident light.

The intensity of light at a selected wavelength band passing through each of the first optical filters 510 and 540, the second optical filters 520 and 550, and the third optical filters 530 and 560 may be converted into a pixel signal by the photoelectric conversion element 410 and the readout circuit. As a result, the response of the pixel including the first optical filter 510 or 530 may follow the response of the low-sensitivity pixel (LPX) shown in FIG. 7, the response of the pixel including the second optical filter 520 or 550 may follow the response of the high-sensitivity pixel (HPX) shown in FIG. 7, and the response of the pixel including the third optical filters 530 or 560 may follow the response of the medium-sensitivity pixel (MPX).

Accordingly, the pixel including the first optical filter 530 or 530 may correspond to the low-sensitivity pixel (LPX), the pixel including the second optical filter 520 or 550 may correspond to the high-sensitivity pixel (HPX), and the pixel including the third optical filter 530 or 560 may correspond to the medium-sensitivity pixel (MPX).

The image sensing device 100 based on other implementations of the disclosed technology may include different air layers 511, 531, 541, and 561 having different thicknesses that are inserted into the optical filters 510, 530, 540, and 560 from among the optical filters 510, 520, 530, 540, 550, and 560, and incorporate the low-sensitivity pixel (LPX), the medium-sensitivity pixel (MPX), and the high-sensitivity pixel (HPX) into one pixel array, such that the image sensing device 100 can form a high dynamic range (HDR) image using only one image.

Although the embodiments disclosed above include the pixel (i.e., LPX or MPX) having a relatively lower sensitivity disposed at a specific position in the quad Bayer pattern, the position of the pixel having a relatively lower sensitivity may be different in other implementations. For example, the pixels each having a relatively lower sensitivity may be randomly spaced apart from one another in the same manner as in phase detection autofocus (PDAF) pixels. In addition, the number of pixels each having a relatively lower sensitivity may be determined to meet the required HDR performance.

As is apparent from the above description, the image sensing device based on some implementations of the disclosed technology can obtain a high dynamic range (HDR) image by capturing images only once.

Although a number of illustrative embodiments have been described, variations and enhancements to the disclosed embodiments and other embodiments can be made based on what is disclosed in this patent document.

What is claimed is:

1. An image sensing device comprising:
   a substrate including first and second photoelectric conversion elements configured to generate photocharge corresponding to an intensity of incident light corresponding to a first color;
   a first pixel including a first color filter disposed over the first photoelectric conversion element to selectively transmit the light corresponding to the first color;
   a second pixel including a second color filter disposed over the second photoelectric conversion element to selectively transmit the light corresponding to the first color; and
   a first air layer disposed between the first color filter and the first photoelectric conversion element to reflect light from the first color filter,
   wherein a reflection of incident light at the first color filter corresponding to the first color and disposed on the first air layer is different from a reflection of incident light at the second color filter corresponding to the first color and disposed on the second photoelectric conversion element.

2. The image sensing device according to claim 1, wherein:
   the first color filter includes a bottom surface that is connected to a top surface of the first air layer; and
   the second color filter includes a bottom surface that is connected to a top surface of the substrate.

3. The image sensing device according to claim 1, wherein:
   an amount of increase in a response of the first pixel that is caused by an increase in the intensity of light incident upon the first pixel is smaller than an amount of increase in a response of the second pixel that is caused by an increase in the intensity of light incident upon the second pixel.

4. The image sensing device according to claim 1, wherein:
   a maximum value of a dynamic range of the first pixel is higher than a maximum value of a dynamic range of the second pixel; and a minimum value of a dynamic range of the first pixel is higher than a minimum value of a dynamic range of the second pixel.

5. The image sensing device according to claim 1, wherein:
a minimum value of a dynamic range of the first pixel is lower than a maximum value of a dynamic range of the second pixel.

6. The image sensing device according to claim 1, wherein:
light transmittance of the first color filter is lower than light transmittance of the second color filter with respect to light beams having a same intensity.

7. The image sensing device according to claim 1, wherein:
a first pixel group formed in a (2×2) matrix array includes one first pixel and three second pixels.

8. The image sensing device according to claim 7, further comprising:
a second pixel group disposed at a first side of the first pixel group, and including a third pixel having a third color filter structured to selectively transmit light corresponding to a second color, and a fourth pixel having a fourth color filter structured to selectively transmit light corresponding to the second color;
a third photoelectric conversion element spaced apart from the third color filter; and
a second air layer disposed between the third color filter and the third photoelectric conversion element to reflect light from the third color filter.

9. The image sensing device according to claim 8, further comprising:
an optical grid structure disposed between the third color filter and the fourth color filter,
wherein the second air layer is disposed below the third color filter and is shorter than the third color filter and higher than the optical grid structure.

10. The image sensing device according to claim 7, further comprising:
a third pixel group disposed at a second side of the first pixel group, and including a fifth pixel having a fifth color filter structured to selectively transmit light corresponding to a third color, and a sixth pixel having a sixth color filter structured to selectively transmit light corresponding to the third color; and
a third air layer included in the fifth color filter to reflect light from the fifth color filter.

11. The image sensing device according to claim 10, further comprising:
an optical grid structure formed between the fifth color filter and the sixth color filter,
wherein the third air layer is disposed below the fifth color filter and is shorter than the fifth color filter and higher than the optical grid structure.

12. The image sensing device according to claim 1, further comprising:
a seventh pixel including a seventh color filter structured to selectively transmit light corresponding to the first color; and
a fourth air layer included in below the seventh color filter and have a smaller thickness than the first air layer.

13. The image sensing device according to claim 12, wherein:
the first pixel, the second pixel and the seventh pixel are structured so that an amount of increase in response of the seventh pixel due to an increase in the intensity of light incident upon the seventh pixel is larger than an amount of increase in response of the first pixel due to an increase in the intensity of light incident upon the first pixel, and is smaller than an amount of increase in response of the second pixel due to an increase in the intensity of light incident upon the second pixel.

14. The image sensing device according to claim 12, wherein:
a maximum value of a dynamic range of the seventh pixel is lower than a maximum value of a dynamic range of the first pixel, and is higher than a maximum value of a dynamic range of the second pixel; and
a minimum value of a dynamic range of the seventh pixel is lower than a minimum value of a dynamic range of the first pixel, and is higher than a minimum value of a dynamic range of the second pixel.

15. The image sensing device according to claim 12, wherein:
a minimum value of a dynamic range of the seventh pixel is lower than a maximum value of a dynamic range of the second pixel; and
a maximum value of a dynamic range of the seventh pixel is higher than a minimum value of a dynamic range of the first pixel.

16. An image sensing device comprising:
a substrate including first, second, and third photoelectric conversion elements configured to generate photocharges corresponding to an intensity of incident light corresponding to a first color; and
a color filter array disposed over first, second, and third photoelectric conversion elements, and configured to include a first color filter corresponding to the first photoelectric conversion element and a second color filter corresponding to the second photoelectric conversion element,
wherein the color filter array includes:
a first air layer disposed between the first color filter and the first photoelectric conversion element to reflect light from the first color filter,
wherein a reflection of incident light at the first color filter corresponding to the first color and disposed on the first air layer is different from a reflection of incident light at the second color filter corresponding to the first color and disposed on the second photoelectric conversion element.

17. The image sensing device according to claim 16, wherein:
the first color filter includes a bottom surface that is connected to a top surface of the first air layer; and
the second color filter includes a bottom surface that is connected to a top surface of the substrate.

18. The image sensing device according to claim 16, wherein the color filter array further includes:
a third color filter disposed over the substrate, and arranged to correspond to the third photoelectric conversion element; and
a second air layer disposed between the third color filter and the third photoelectric conversion element to have a smaller thickness than the first air layer.

19. The image sensing device according to claim 18, wherein the color filter array further includes:
a plurality of optical grid structures disposed among the first color filter, the second color filter, and the third color filter,
wherein the second air layer disposed between a lower portion of the third color filter and a top surface of the substrate, and formed to have a smaller thickness than the first air layer and each of the optical grid structures.

20. The image sensing device according to claim 16, wherein:
  light transmittance of the first color filter is lower than light transmittance of the second color filter with respect to light beams having a same intensity.

* * * * *